US011451975B2

(12) United States Patent
de Goycoechea

(10) Patent No.: US 11,451,975 B2
(45) Date of Patent: Sep. 20, 2022

(54) SIGNAL DISTRIBUTION SYSTEM WITH INTEGRATED BASE TRANSCEIVER STATION

(71) Applicant: Ricardo Matias de Goycoechea, Cordoba (AR)

(72) Inventor: Ricardo Matias de Goycoechea, Cordoba (AR)

(73) Assignee: FIPLEX COMMUNICATIONS, INC., Miami, FL (US)

( * ) Notice: Subject to any disclaimer, the term of this patent is extended or adjusted under 35 U.S.C. 154(b) by 0 days.

(21) Appl. No.: 16/730,087

(22) Filed: Dec. 30, 2019

(65) Prior Publication Data
US 2020/0213866 A1 Jul. 2, 2020

Related U.S. Application Data

(60) Provisional application No. 62/786,803, filed on Dec. 31, 2018.

(51) Int. Cl.
*H04W 88/08* (2009.01)
*H04W 16/26* (2009.01)
*H04B 7/155* (2006.01)
*H04W 16/20* (2009.01)

(52) U.S. Cl.
CPC ........ *H04W 16/26* (2013.01); *H04B 7/15507* (2013.01); *H04W 16/20* (2013.01); *H04W 88/085* (2013.01)

(58) Field of Classification Search
CPC ... H04W 16/26; H04W 88/085; H04W 16/20; H04B 7/15507
See application file for complete search history.

(56) References Cited

U.S. PATENT DOCUMENTS

| | | | | | |
|---|---|---|---|---|---|
| 5,479,409 | A | * | 12/1995 | Dupuy | H04W 56/0045 370/337 |
| 6,577,878 | B1 | * | 6/2003 | Park | H04W 88/085 370/350 |
| 6,970,498 | B1 | * | 11/2005 | Chung | H04B 1/001 375/147 |
| 2008/0261611 | A1 | * | 10/2008 | Mia | H04W 16/18 455/456.1 |
| 2012/0257560 | A1 | * | 10/2012 | Srinivasan | H04L 67/2842 370/312 |
| 2013/0182698 | A1 | * | 7/2013 | Larsen | H04W 56/0045 370/342 |
| 2014/0308043 | A1 | * | 10/2014 | Heidler | H04B 10/808 398/115 |
| 2017/0373708 | A1 | * | 12/2017 | Yoshino | H04B 1/0475 |
| 2018/0035467 | A1 | * | 2/2018 | Kudo | H04W 74/0833 |
| 2018/0294866 | A1 | * | 10/2018 | Ashworth | H04B 7/2606 |
| 2020/0100246 | A1 | * | 3/2020 | Stefanik | H04W 72/0433 |

* cited by examiner

*Primary Examiner* — Andrew Wendell
(74) *Attorney, Agent, or Firm* — Rafael Perez-Pineiro; The Brickell IP Group, PLLC

(57) ABSTRACT

An communication system is disclosed which improves upon known distributed antenna systems and known signal distribution systems which rely on bidirectional amplifiers. The disclosed communication system incorporates an integrated base transceiver station into remote units or bidirectional amplifiers provided proximate a coverage area, where the coverage area is remote or closed off from a base coverage area for a distant signal source such as a base transceiver station.

10 Claims, 6 Drawing Sheets

SIGNAL DISTRIBUTION SYSTEM WITH INTEGRATED BASE TRANSCEIVER STATION

CROSS REFERENCE TO RELATED APPLICATIONS

This application claims the benefit of U.S. Provisional Application No. 62/786,803 filed Dec. 31, 2018, the disclosure of which is hereby incorporated herein by reference in its entirety.

FIELD OF THE DISCLOSURE

This disclosure relates generally to communication systems for distributing signals in a communications network.

BACKGROUND

A bidirectional amplifier or signal booster 10 amplifies radio signals 21, 22 passing between a signal source 12, such as a base transceiver station, to terminal units or terminal equipment 16, such as a radio or a cell phone. The base transceiver station 12 can be connected to the bidirectional amplifier 10 in a variety of ways. One such way is through an air interface or channel where the radio signal 21 is propagated from an antenna 18 through open air and received by another antenna 24 connected to the bidirectional amplifier 10. The connection between signal source 12 and the bidirectional amplifier 10 could also manifest through a physical link such as a coaxial cable or optical fiber, and the signal 21a may be sent to the terminal units 16 through an interface from one or more antennas 26 distributed throughout a coverage area 20 where the terminal units 16 are located. Signals transmitted to terminal units 16 may be referred to as downlink signals (21, 21a), and signals transmitted from the terminal units 16 may be referred to as uplink signals (22, 22a). FIG. 1 is a demonstrative illustration of known systems for transmitting signals between a signal source 12 and a terminal unit 16 through a bidirectional amplifier 10. In this demonstrative prior art system, the bidirectional amplifier 10 receives downlink signals 21 from the signal source 12 as well as uplink signals 22 from the terminal unit 16. This results in an amplified downlink signal 21a between the bidirectional amplifier 10 and the terminal unit 16 and an amplified uplink signal 22a between the bidirectional amplifier 10 and the base transceiver station 12. The downlink signal 21 from the signal source and the uplink signal 22 from the terminal unit remain unaltered by the bidirectional amplifier 10, except that the bidirectional amplifier also amplifies noise and also introduces noise, such as thermal noise, for example.

A distributed antenna system 30 is a known variation of the prior art system shown in FIG. 1. In a distributed antenna system 30, the base transceiver station 12 connects with a principal or master unit 32 of the distributed antenna system 30, and master unit 32 in turn is connected to one or more secondary or remote units 34. Each remote unit 34 may be in turn be connected to one or more antennas (19a-d), which may be referred to as nodes in the distributed antenna system 30. In one implementation, a plurality of nodes 19a-c may individually provide local coverage 20a-c within a broader coverage area 20. FIG. 2 is a demonstrative illustration of such a distributed antenna system 30.

These aforementioned known systems are currently being applied to propagate signals to enclosed or partially enclosed environments (e.g., coverage areas 20 and 20d) where direct signals from base transceiver stations 12 are out of range from the desired coverage areas and terminal units 16 within, or if not out of range then too weak to provide a reliable or quality communication. These known systems allow for an acceptable quality of communications services, such voice and data signal transmission, within these closed or remote coverage areas.

Transmitting from a central base transceiver station 12 to a distributed antenna system 30 and/or utilizing a bidirectional amplifier 10 has numerous limitations. Base transceiver stations 12 do not have unlimited traffic capacity. Thus, when a distributed antenna system 30 is employed, or even a single bidirectional amplifier 10 to reach a remote coverage area 20, for example, the traffic capacity is dedicated to providing service at the remote coverage area 20. Because traffic capacity is finite, this necessarily reduces coverage directly from the base transceiver station 12. Of further concern is that the use of bidirectional amplifiers 10 not only boost signals 21, 22 but also boosts input signal noise, and also introduces additional noise such as thermal noise, which can be introduced by the distributed antenna system 30 or the bidirectional amplifier 10. The noise is particularly problematic in the uplink signal 22. By increasing noise, performance of the network is degraded. Also problematic is signal delay added by the distributed antenna system 30 or the bidirectional amplifier 10. This delay affects the synchronization of the system and also contributes to interference, such as time domain interference or extreme multipath interference. This interference is particularly potent where a terminal unit 16 is at the border between remote coverage area 20 and the central coverage area provided by base transceiver station 12, for example when the terminal unit is close to the antenna 24 (FIG. 1) or antenna 28 (FIG. 2).

Another known solution for providing signal propagation to closed or remote coverage areas is to provide local or intermediate base transceiver stations 12a to establish a signal distribution system 40. These intermediate base transceiver stations 12a may be positioned within communication range of terminal units 16 where the terminal units 16 otherwise would be outside of communication range from distant base transceiver station 12. Intermediate base transceiver stations may be of different sizes or operate on different bands. Intermediate base transceiver stations 12a may be connected, such as through a base transceiver station backbone 42, to one or more base transceiver station networks 44 located in another area. In this known system, each intermediate base transceiver station 12a generates its own coverage area 20. FIG. 3 is a demonstrative illustration of such a signal distribution system 40.

Utilizing intermediate base transceiver stations 12a also has its drawbacks. To begin with, this signal distribution system 40 is significantly more costly than a distributed antenna system 30. Additionally, base transceiver stations 12a are deployed for particular communication systems, such as systems dedicated to support of a police department, fire department, or ambulance network. Thus, a signal distribution system 40 as described herein proves difficult to accommodate terminal unit 16 coverage for multiple, different communication systems (police, fire department, etc.). In order for a signal distribution system 40 to function for multiple communication systems, multiple intermediate base transceiver stations 12a must be deployed for each remote coverage area 20. This is impractical and costly. Of final concern is the consequence of failure of an intermediate base transceiver station 12a, which would result in a complete loss of coverage for that communication system.

BRIEF SUMMARY OF THE DISCLOSURE

The following presents a simplified summary of the disclosure in order to provide a basic understanding of some aspects of the various embodiments disclosed herein. This summary is not an extensive overview of every detail of every embodiment. It is intended to neither identify key or critical elements of every embodiment nor delineate the scope of every disclosed embodiment. Its sole purpose is to present some concepts of disclosure in a simplified form as a prelude to the more detailed description that is presented later.

In one embodiment of the disclosure a communication system is provided. The communication system may include a base transceiver station for transmitting and receiving remote data signals within to and from a target coverage area, a bidirectional amplifier interposed between the base transceiver station and the target coverage area, with the bidirectional amplifier incorporating an integrated base transceiver station operable to generate local data signals. The communication system also includes an integrated coverage area antenna connected with the bidirectional amplifier and the integrated base transceiver station and operable to transmit and receive the remote data signals and the local data signals to and from terminal units within the target coverage area. The integrated base transceiver station incorporated in the bidirectional amplifier may be connected to a principal communication network core.

In one embodiment, the communication system may include a base transceiver a distributed antenna system interposed between the base transceiver station and the target coverage area. The distributed antenna system may include a master unit connected to at least one remote unit. The at least one remote unit incorporates an integrated base transceiver station operable to generate local data signals. The communication system may also include an integrated coverage area antenna connected with the at least one remote unit and the integrated base transceiver station. The integrated coverage area antenna is operable to transmit and receive the remote data signals and the local data signals to and from terminal units within the target coverage area. The integrated base transceiver station incorporated in the remote unit may be connected to a principal communication network core.

The following description and annexed drawings set forth certain illustrative aspects of the disclosure. These aspects are indicative, however, of but a few of the various ways in which the principles disclosed may be employed. Other advantages and novel features disclosed herein will become apparent from the following description when considered in conjunction with the drawings.

DETAILED DESCRIPTION OF THE DISCLOSURE

The following detailed description and the appended drawings describe and illustrate some embodiments for the purpose of enabling one of ordinary skill in the relevant art to make use the invention. As such, the detailed description and illustration of these embodiments are purely illustrative in nature and are in no way intended to limit the scope of the invention, or its protection, in any manner. It should also be understood that the drawings are not necessarily to scale and in certain instances details may have been omitted, which are not necessary for an understanding of the disclosure, such as details of fabrication and assembly. In the accompanying drawings, like numerals represent like components.

The exemplary implementations disclosed herein include the integration of the functionality of one or more base transceiver station units within a bidirectional amplifier (FIG. 4) and/or the remote units of a distributed antenna system (FIG. 5) so that a single installation can provide coverage service to multiple systems (cellular, police, fire department, etc.)

By being integrated with the principal communication systems, the integrated base transceiver station ("iBTS") can generate signals locally. For example, in an area of interest such as an indoor area of a building, there is typically a principal communications system that is installed in the premises in order to provide the extended coverage. The present solution includes integrating a mix of iBTSs from other communications systems into bidirectional amplifiers and distributed antenna systems in accordance with one embodiment. The iBTS is connected via a backhaul connection to the principal communication systems core, meaning that the iBTS is part of the principal communications system BTS network. By using an iBTS there is no need to install a principal communications system BTS in the building, for example, or take RF signals from a distant principal communications system BTS as a traditional DAS (distributed antenna system) or BDA (bidirectional amplifier) does—the traffic information and communication data is sent from each iBTS to the principal communications system core via a backhaul connection as a conventional local BTS does. Integration of the iBTS with the bidirectional amplifier and distributed antenna system allows expansion of the coverage for the other minor systems that cannot afford the cost of installing their own local BTS.

Figure 1:
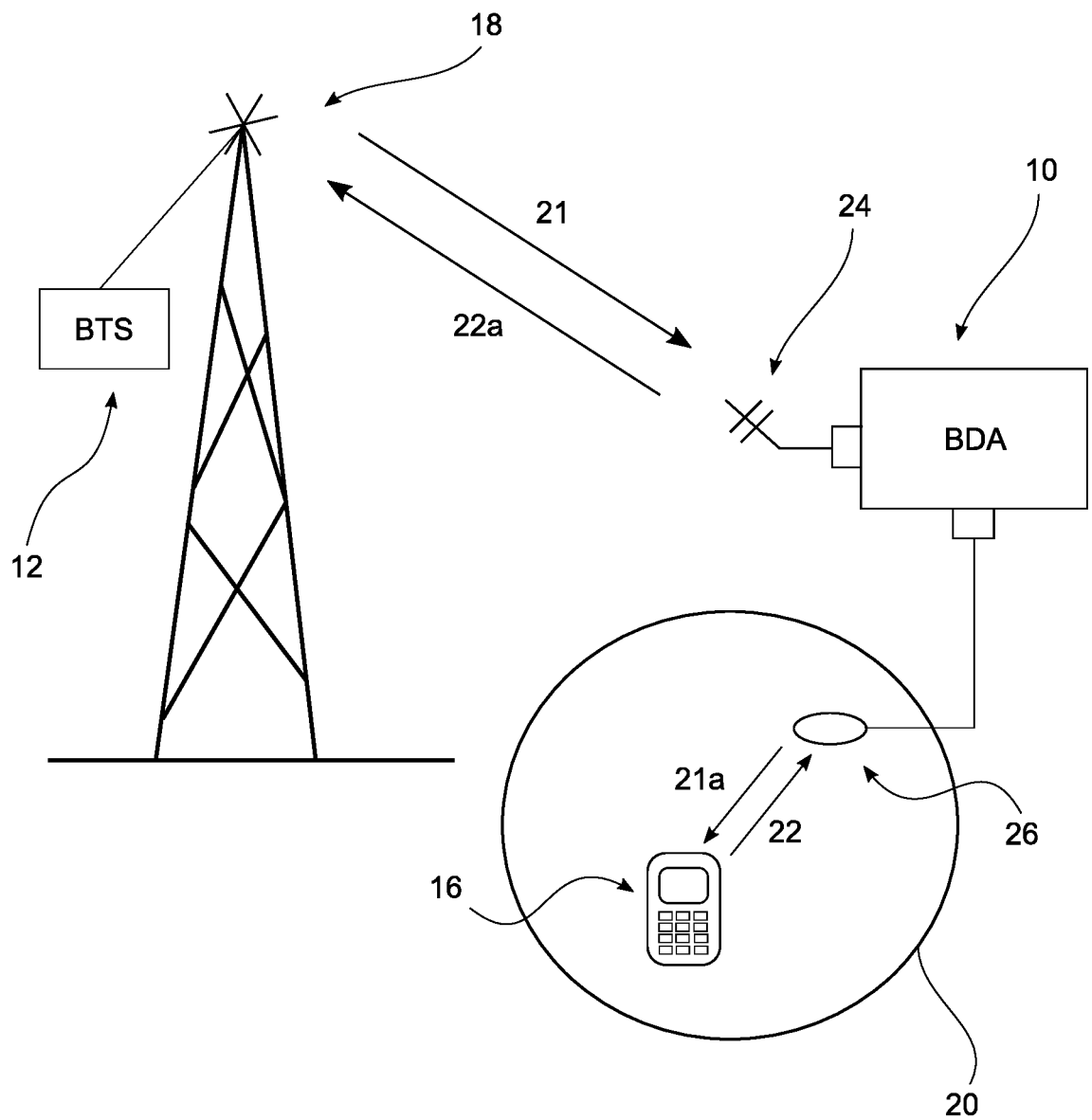
FIG. 1 illustrates a prior art communication system for distributing signals using a bidirectional amplifier.
Figure 2:
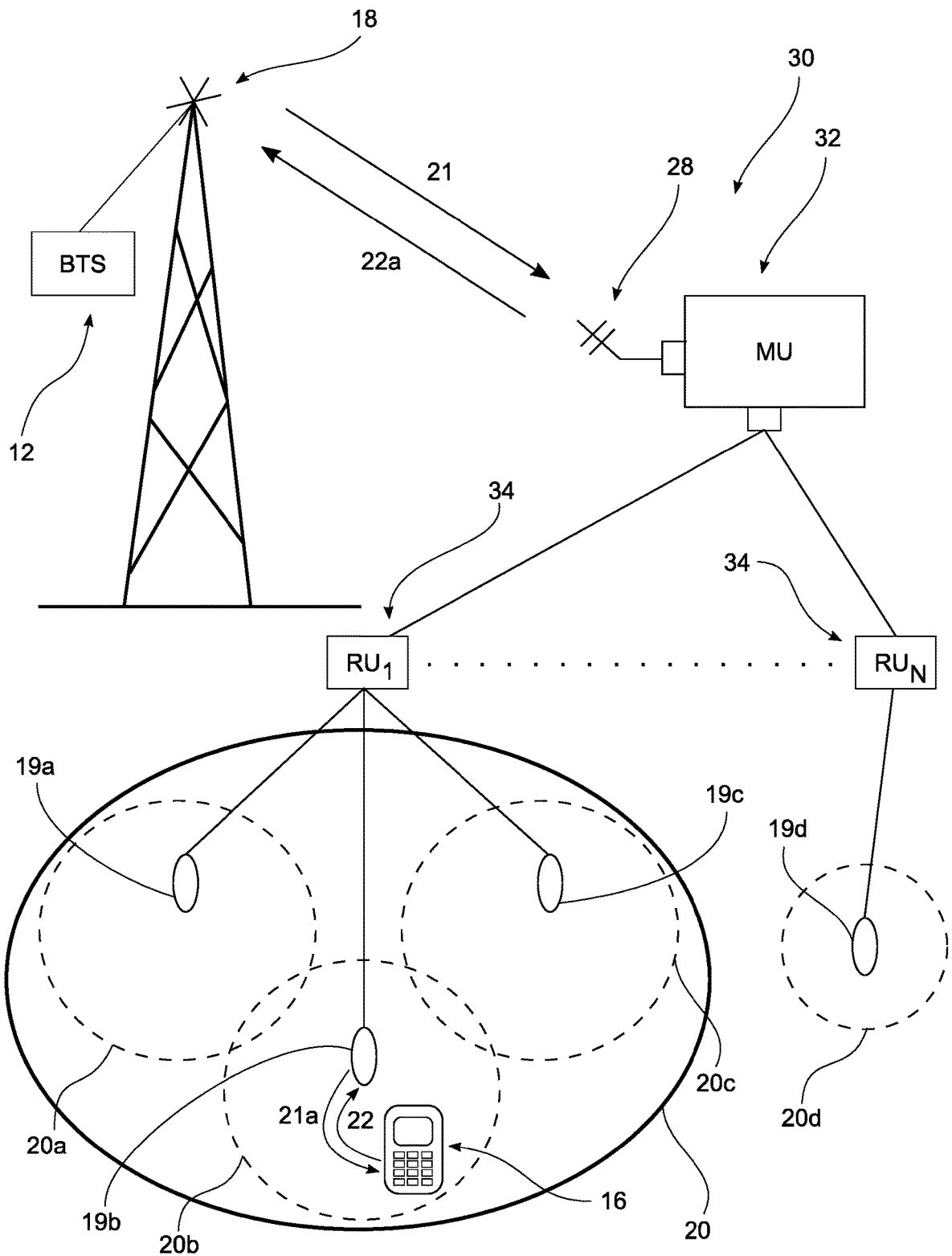
FIG. 2 illustrate a prior art communication system for distributing signals using a fiber distributed antenna system.
Figure 3:
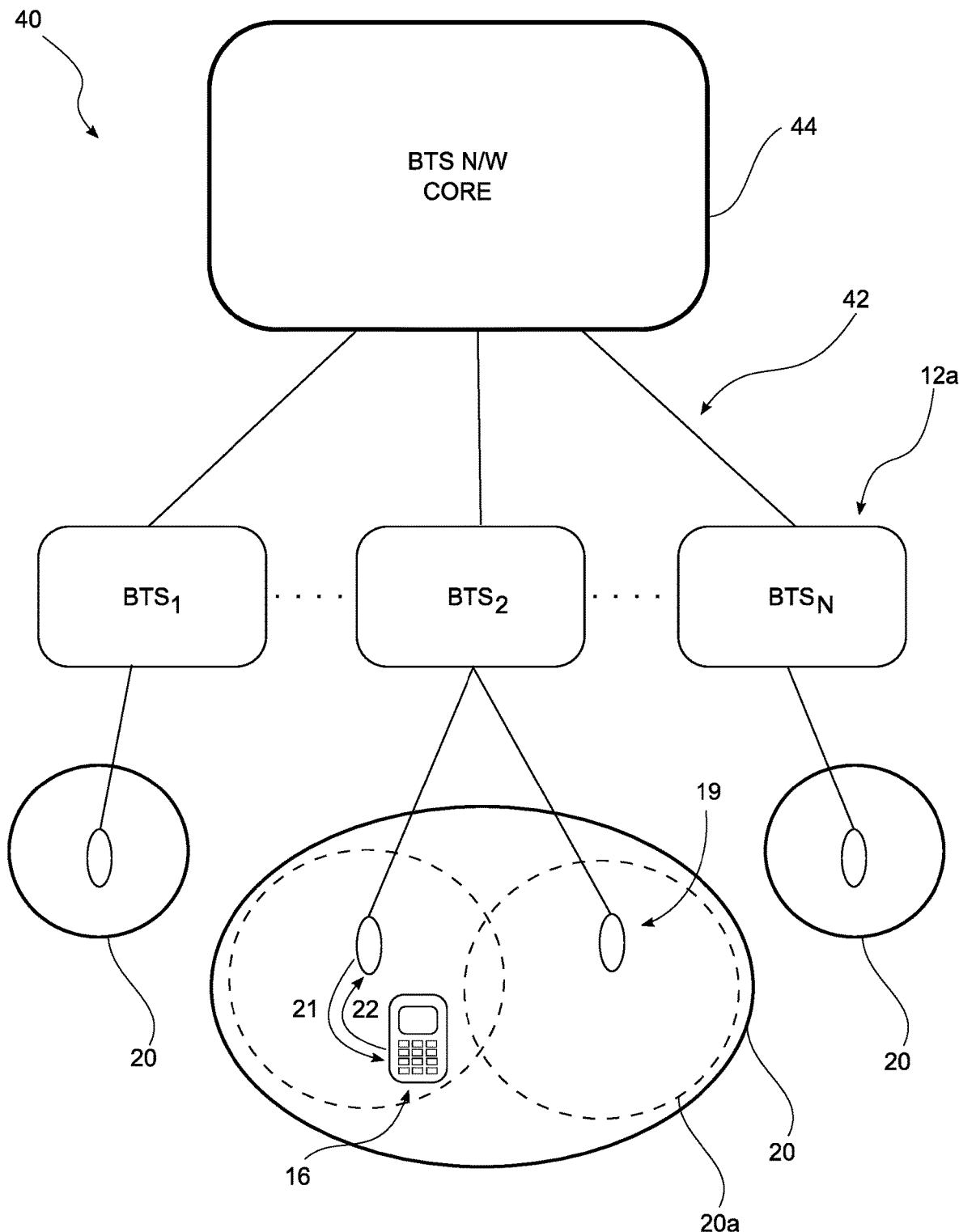
FIG. 3 illustrates a prior art signal distribution system using intermediate base station transceivers.
Figure 4:
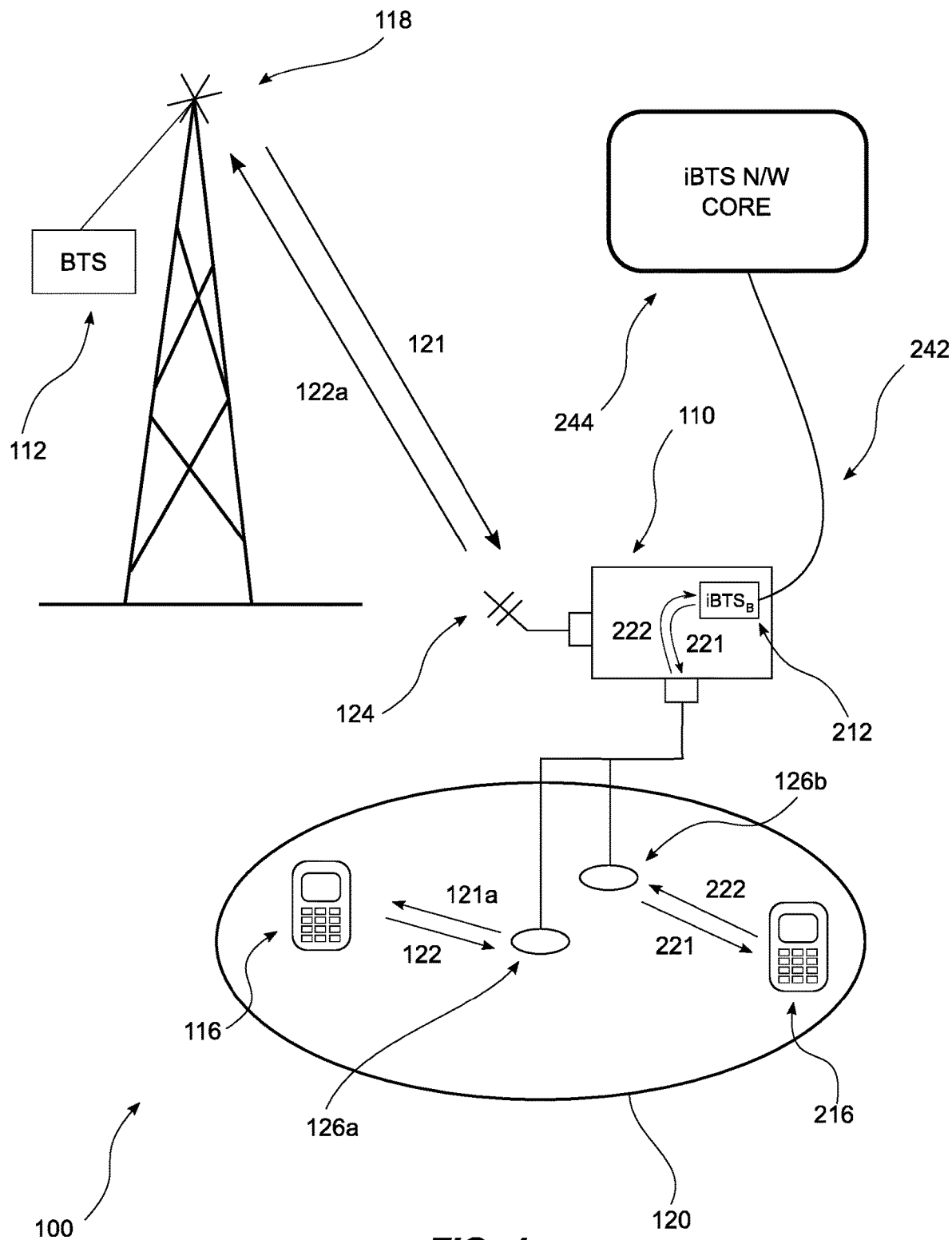
FIG. 4 illustrates an embodiment of a communication system with an integrated base transceiver station integrated or incorporated in a bidirectional amplifier.

Referring now to FIG. 4, an antenna system 100 includes a bidirectional amplifier 110 with an integrated base transceiver station 212. The bidirectional amplifier 110 and integrated base transceiver station 212 coverage area can be the same or different, depending on the indoor coverage planning needs.

In one embodiment, the integrated base transceiver station 212 may implement some of the functionality of one or more base transceiver station units similar to the functionality of distant base transceiver station 112. The information or data sent to the base transceiver station 112 (through uplink signals 122a) comprise RF signals that contain the modulating information (voice, data, headers and other signaling/traffic data) that is typically known as baseband information, while the data sent back to the integrated base transceiver station network core 244 can be the complete baseband information (in 1's and 0,'s not modulated) or can be a part of the baseband information, as the integrated base transceiver station can add/remove part of the signaling/traffic data that is part of the entire baseband information.

The BTS 112 may have more capacity and power than the iBTS 212. The iBTS 212 and BTS 112 can be part of the same system, for example in a scenario where the BTS 112 provides macro/outdoor coverage and the iBTS 212 provides indoor coverage, or alternatively, they can be separate, independent systems. The solution presented in this disclosure aims to LMR technologies such as P25 phase 1, P25 phase 2, DMR, Tetra, among others.

Each integrated base transceiver station unit integrated with the bidirectional amplifier may correspond to a different dedicated system, such as for example, different public safety communications systems (police, fire department, etc.). In accordance with the present disclosure, there is no requirement that an integrated base transceiver station 212 has to be under the control of a particular agency (for example, police department) and the distant base transceiver station 112 under the control of another (for example, fire department). There can be a single or same agency/system relying on both the base transceiver station 112 and the integrated base transceiver station 212, and in such embodiment the base transceiver station 112 and the integrated base transceiver station 212 complement each other with respect to coverage. Alternatively, as mentioned above, the base transceiver station 112 and the integrated base transceiver station 212 may be under the control of different agencies/systems providing different communications services. In this manner, a single installation can provide service to such multiple systems (police, fire department, cellular, etc.).

The bidirectional amplifier is capable of receiving a downlink signal 121 from a distant base transceiver station 112 and transmitting an uplink signal 122a to the distant signal source 112. The bidirectional amplifier 110 may transmit and receive the downlink signal 121a and uplink signal 122 to and from a first terminal unit 116, via an antenna 126a positioned within coverage area 120, and the first terminal unit 116 is configured to receive and process the data received and sent through signals 121a, 122. The bidirectional amplifier 110 may also serve to boost data signals thereby providing an amplified downlink signal 121a to first terminal unit 116 and an amplified uplink signal 122a before transmission to signal source 112.

Antenna system 100 may also include the integrated base transceiver station 212 locally integrated into the bidirectional amplifier 110. Integrated base transceiver station 212 may transmit and receive a set of data signals 221, 222 (referred herein also as intermediate or local set of data signals), dedicated to a public safety agency or entity different than the entity or entities utilizing the base transceiver station 112 for providing coverage, as discussed above. These data signals 221 may be transmitted to coverage area 120 and a second terminal unit 216 within the coverage area 120 through use of antenna 126b. Due to the close proximity of the integrated base transceiver station 212 with the terminal units, the intermediate set of data signals 221, 222 need not be amplified by the bidirectional amplifier 110. Integrated base transceiver station 212 may be connected via a backhaul connection 242 to a principal communications network core 244.

Antenna 126a may be in communication with a first terminal unit 116 which may process the downlink data signal 121 generated by distant base transceiver station 112. Antenna 126b may be in communication with a second terminal unit 216 which may process the downlink intermediate data signal 221 generated by the integrated base transceiver station 212 as well as the downlink data signal 121 from base transceiver station 112 (not shown in the figure). It is contemplated within the disclosure that a single terminal unit may be configured to receive and process both distant (e.g., downlink signal 121) and intermediate (e.g., downlink signal 221) data signals as well as transmit uplink signals to either the corresponding bidirectional amplifier or the iBTS. In the illustrated embodiment, terminal unit 216 can be accessed through two separate cellular communications systems. However, it should be appreciated that the disclosed antenna system 100 obviates the need to implement a principal communication system network core 244 in proximity to the coverage area 120, such as a coverage area in a building. There is also no need for the communications system to exclusively rely on distant data signals 121, 122 and the need to boost those distant signals.

Figure 5:
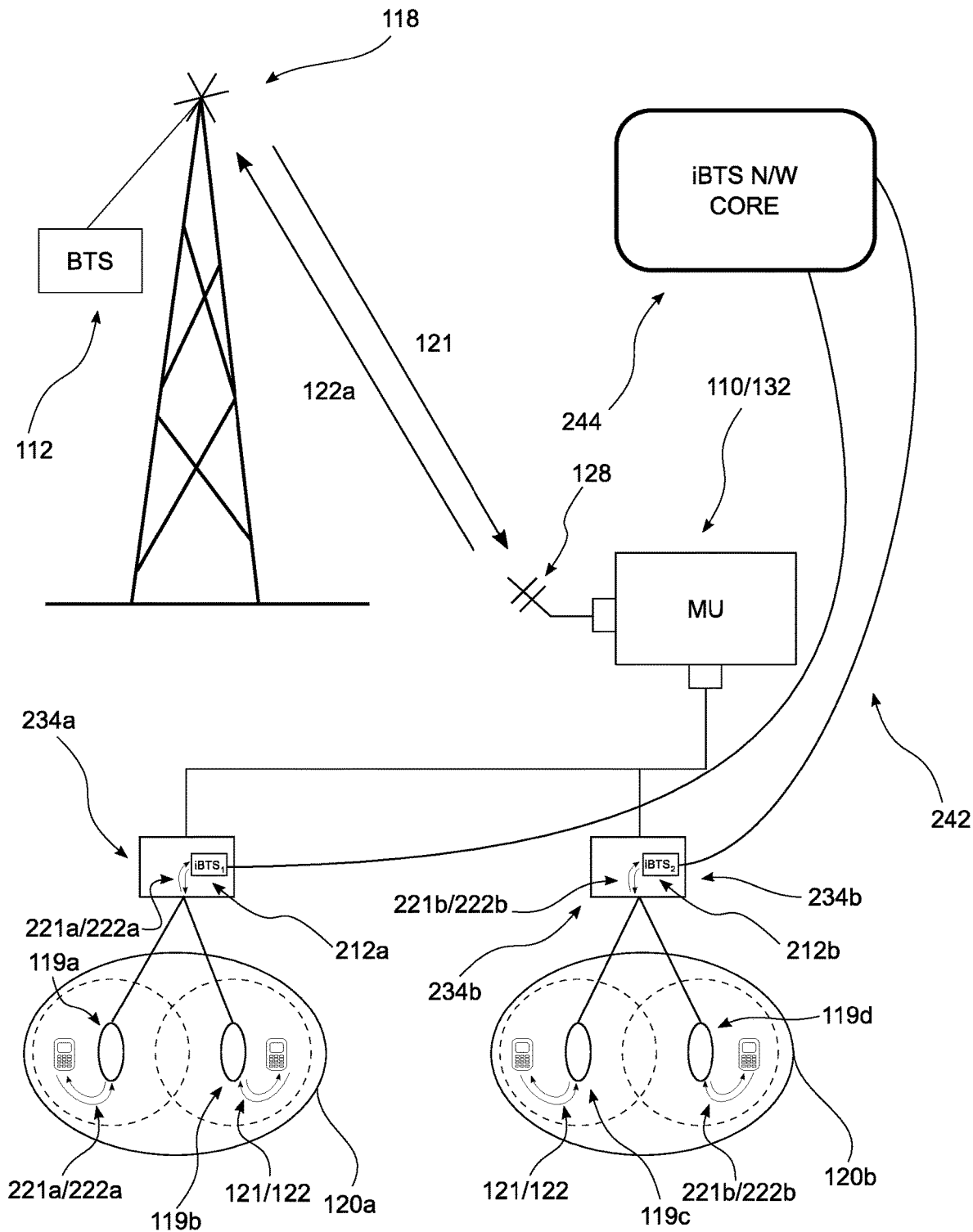
FIG. 5 illustrates an embodiment of a communication system with an integrated base transceiver station integrated or incorporated in one or more remote units of a distributed antenna system.

With reference to FIG. 5, an antenna system may be implemented through use of a digital fiber distributed antenna system, which may include a master unit 132 connected to one or more secondary or remote units 234a-b through digital fiber links. The remote units 234a-b may be positioned to provide intended coverage areas 120a-b. Master unit 132 may include an antenna 128 for transmitting and receiving distant data signals 122a and 121 to and from a distant base transceiver station 112.

Antennas serving as nodes 119a-b and connected to remote unit 234a may provide overlapping local coverage areas within the coverage area 120a, and antennas serving as nodes 119c-d and connected to remote unit 234b may provide overlapping local coverage areas within the coverage area 120b. An integrated base transceiver station may be integrated with a remote unit in a manner similar to the integration to the BDA discussed with respect to FIG. 4. For example, integrated base transceiver station 212a may be integrated with remote unit 234a and integrated base transceiver station 212b may be integrated with remote unit 234b.

Each integrated base transceiver station 212a, 212b may be configured to operate on its own band. Integrated base transceiver station 212a may transmit and receive a set of data signals 221a, 222a (referred herein also as intermediate or local set of data signals), dedicated to a public safety agency or entity different than the entity or entities utilizing the base transceiver station 112 for providing coverage, as discussed above. The data signals 221a may be transmitted by the iBTS 212a to a terminal unit within coverage area 120a through use of antenna 119a. Due to the close proximity of the integrated base transceiver station 212a to the terminal units in coverage area 120a, the intermediate set of data signals 221a, 222a need not be amplified by the remote unit 234a. Integrated base transceiver station 212a may be connected via a backhaul connection 242 to a principal communications network core 244 as a conventional local BTS does. Antenna 119b may be in communication with a terminal unit which may process the downlink data signal 121 generated by distant base transceiver station 112 and relayed by the remote unit 234a.

It is contemplated within the disclosure that a single terminal unit may be configured to receive and process both distant (e.g., downlink signal 121) and intermediate (e.g., downlink signal 221) data signals as well as transmit uplink signals to either the corresponding bidirectional amplifier or the iBTS. In the illustrated embodiment, each terminal unit can be accessed through two separate cellular communications systems. However, it should be appreciated that the disclosed antenna system 100 obviates the need to deploy a principal communication network core 244 in proximity to the coverage area 120, such as a communications system throughout a building. There is also no need for the communications system to exclusively rely on distant data signals 121, 122 and the need to boost those distant signals.

By incorporating integrated base transceiver stations 212 into the bidirectional amplifier 110 and/or the remote units 234, the integrated base transceiver stations 212 provide the ability to handle communications without having to rely on the ability of distant base transceiver stations 112 to provide capacity and/or coverage. In embodiments where distant signals 121, 122 are the same type of data signals as intermediate signals 221, 222, the disclosed system may prevent local coverage areas 120 from utilizing data bandwidth which would otherwise be dedicated to distant base transceiver station's direct coverage area.

Figure 6:
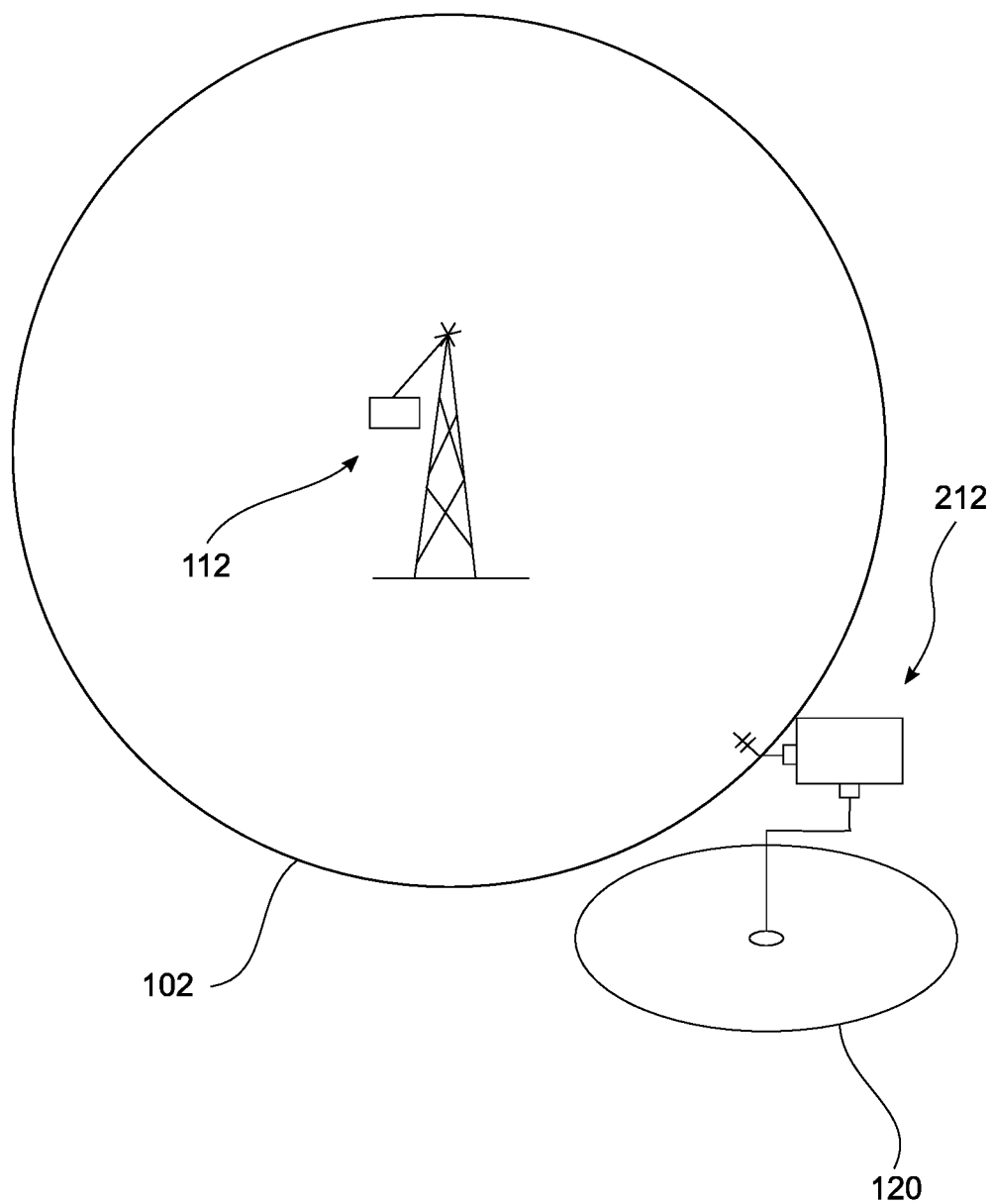
FIG. 6 illustrates the relationship between a base coverage area and an integrated coverage area in accordance with an embodiment of an integrated antenna system.

FIG. 6 provides an illustration of the distant coverage area 102 covered by the distant base transceiver station 112 and its antenna 118 juxtaposed against the integrated coverage area 120. As illustrated, the distant coverage area 102 and the integrated coverage area 120 do not overlap. However, the integrated antenna system 100 may be employed to create an integrated coverage area 120 that minimally overlaps with the distant coverage area 102, meaning that the integrated coverage area 120 may be situated on a boundary of the distant coverage area 102 or integrated coverage area 120 may cover an enclosed environment, such as a building, which may be technically situated within the distant coverage area 102 but terminal units 116 within cannot communicate with base transceiver station 112.

It should be appreciated that a theoretically unlimited number of integrated base transceiver stations 212 and remote units 234 may be employed to transmit a theoretically unlimited number of types of intermediate data signals 221, 222 for a theoretically unlimited number of coverage areas 120, as might be required by a designer of the integrated antenna system 100. Moreover, a plurality of integrated base transceiver stations 212 may be utilized within a single remote unit 234.

Integrated antenna system 100 reduces interference and synchronization concerns of known, prior art systems. Integrated base transceiver stations 212 can establish the synchronization with other base transceiver stations 112, and because the integrated base transceiver stations 212 manage their own communication channels, there are no border zones, thus reducing interference such as time domain interference, multipath interference, and so forth. The synchronization between integrated base transceiver station 212 and other base transceiver stations 112 promotes a clean and uninterrupted handover of the terminal unit 116 should it move between coverage areas 102, 120.

Integrated antenna system 100 also facilitates identifying the location of the terminal units 116. When data signals 121, 122 are telecommunications signals and a cellular phone is the terminal unit 116, integrated base transceiver station 212 can report a call occurring in integrated coverage area 120.

With integrated iBTS, no amplification is necessary since the iBTS is considered a signal source. The iBTS does not require receiving RF signals from other BTSs and amplify them in a Downlink direction or receive signals from the terminal units in an uplink direction to feed them to the BTSs. The iBTSs directly listen to the indoor/extended area. The iBTSs are connected to antennas placed inside the building, for example, through use of coaxial cable and in turn can communicate with terminal units within the coverage area through use of these antennas. Thus, those iBTSs are not affected by the typical noise (inserted by amplifier and amplified) of a bidirectional amplifier or distributed antenna system. Likewise, other iBTSs are not affected by noise, and no degradation in the performance of their receivers will occur.

By having integrated BTSs, these iBTSs can establish the synchronization with the other BTSs on the same network, and because the iBTSs manage their own communication channels, there are no border zones, thus reducing interference such as time domain interference, multipath interference, etc. Therefore, by virtue of the iBTSs being in synchronization with the other BTSs, the iBTSs can maintain the conditions of simulcast, and handovers can be generated from the iBTSs to other BTSs, and vice versa, in the event that terminal units leave the coverage area of the iBTS and enter the coverage area of another BTS of the same system, and vice versa.

When the iBTSs are integrated into the remote units of the distributed antenna system, and because a remote unit of a distributed antenna system is supported by a finite and limited number of antennas, where the antennas cover a limited portion of the total coverage area of the distributed antenna system, then when a call originates in that area of coverage of the distributed antenna system, it becomes a simple exercise to have the iBTS (integrated by the remote unit) report that a particular call originated in that remote unit's coverage area, allowing a terminal to be easily located from where that communication was generated.

By being a mixed solution where BTS coverage is provided by minor systems or systems that cannot afford the cost of installing a BTS, together with integrated BTS functionality from the main systems, the present solution allows to offer a single solution that reuses all the hardware already installed in extended coverage areas to provide all the necessary coverage from the different systems (cellular, police, fire department, etc.).

By being a mixed solution, in the event of an integrated BTS failure, the bidirectional amplifier or distributed antenna system can provide coverage by taking signals from other distant BTSs that are part of the integrated BTS system—the present implementation provides expanded coverage as a redundancy method.

The descriptions set forth above are meant to be illustrative and not limiting. Various modifications to the disclosed embodiments, in addition to those described herein, will be apparent to those skilled in the art from the foregoing description. Such modifications are also intended to fall within the scope of the concepts described herein. The disclosures of each patent, patent application, and publication cited or described in this document are hereby incorporated herein by reference, in their entireties.

The foregoing description of possible implementations consistent with the present disclosure does not represent a list of all such implementations or all variations of the implementations described. The description of some implementations should not be construed as an intent to exclude other implementations described. For example, artisans will understand how to implement the disclosed embodiments in many other ways, using equivalents and alternatives that do not depart from the scope of the disclosure. Moreover, unless indicated to the contrary in the preceding description, no particular component described in the implementations is essential to the invention. It is thus intended that the embodiments disclosed in the specification be considered illustrative, with a true scope and spirit of invention being indicated by the following claims. Further, the limitations of the following claims are not written in means--plus-function format and are not intended to be interpreted based on 35 U.S.C. 112(f), unless and until such claim limitations expressly use the phrase "means for" followed by a statement of function void of further structure.

What is claimed:

1. A communication system comprising:
a base transceiver station, connected via a first backhaul connection to a communication system core, for transmitting and receiving remote data signals within to and from a target coverage area;
a bidirectional amplifier interposed between the base transceiver station and the target coverage area, said bidirectional amplifier incorporating an integrated base transceiver station connected via a second backhaul connection to a communication system core, wherein the integrated base transceiver station is operable to generate local data signals; and
an integrated coverage area antenna connected with the bidirectional amplifier and the integrated base transceiver station, the integrated coverage area antenna operable to transmit and receive the remote data signals and the local data signals to and from terminal units within the target coverage area; wherein said integrated base transceiver station manages its own communication channels and establishes synchronization with said base transceiver station to reduce interference.

2. The communication system of claim 1, wherein the integrated base transceiver station is connected via a backhaul connection to a principal communications systems core.

3. The communication system of claim 1 further comprising a second integrated coverage area antenna connected with the bidirectional amplifier and the integrated base transceiver station, the second integrated coverage area antenna operable to transmit and receive the remote data signals and intermediate data signals within a second target coverage area, and
the target coverage area and the second target coverage area collectively defining an integrated coverage area.

4. The communication system of claim 3 further comprising:
a second integrated base transceiver station incorporated into the bidirectional amplifier, the second integrated base transceiver station operable to generate second local data signals,
wherein the second integrated base transceiver station is connected with the integrated coverage area antenna and the integrated coverage area antenna is further operable to transmit and receive second local data signals within the integrated coverage area.

5. The communication system of claim 4, wherein the integrated base transceiver station and the second integrated base transceiver station are both connected via a backhaul connection to a principal communications systems core.

6. A communication system comprising:
a base transceiver station, connected via a first backhaul connection to a communication system core, for transmitting and receiving remote data signals within to and from a target coverage area;
a distributed antenna system interposed between the base transceiver station and the target coverage area, said distributed antenna system comprising a master unit connected to at least one remote unit, wherein the at least one remote unit incorporates an integrated base transceiver station connected via a second backhaul connection to a communication system core and operable to generate local data signals; and
an integrated coverage area antenna connected with said at least one remote unit and the integrated base transceiver station, the integrated coverage area antenna operable to transmit and receive the remote data signals and the local data signals to and from terminal units within the target coverage area;
wherein said integrated base transceiver station manages its own communication channels and establishes synchronization with said base transceiver station to reduce interference.

7. The communication system of claim 6, wherein the integrated base transceiver station is connected via a backhaul connection to a principal communications systems core.

8. The communication system of claim 6 further comprising a second integrated coverage area antenna connected with the at least one remote unit and the integrated base transceiver station, the second integrated coverage area antenna operable to transmit and receive the remote data signals and intermediate data signals within a second target coverage area,
and the target coverage area and the second target coverage area collectively defining an integrated coverage area.

9. The communication system of claim 8 further comprising:
a second integrated base transceiver station incorporated into a second remote unit, the second integrated base transceiver station operable to generate second local data signals,
wherein the second integrated base transceiver station is connected with the integrated coverage area antenna and the integrated coverage area antenna is further operable to transmit and receive second local data signals within the integrated coverage area.

10. The communication system of claim 9, wherein the integrated base transceiver station and the second integrated base transceiver station are both connected via a backhaul connection to a principal communications systems core.

* * * * *